(12) United States Patent
Allen

(10) Patent No.: US 7,647,163 B2
(45) Date of Patent: Jan. 12, 2010

(54) AUTOMATED FUELING INFORMATION TRACKING AND FUEL HEDGING

(75) Inventor: David L. Allen, Kent, WA (US)

(73) Assignee: The Boeing Company, Chicago, IL (US)

(*) Notice: Subject to any disclaimer, the term of this patent is extended or adjusted under 35 U.S.C. 154(b) by 508 days.

(21) Appl. No.: 11/197,156

(22) Filed: Aug. 4, 2005

(65) Prior Publication Data

US 2007/0032941 A1 Feb. 8, 2007

(51) Int. Cl.
*G06F 19/00* (2006.01)
*G01C 23/00* (2006.01)

(52) U.S. Cl. .......................................... 701/123; 701/3
(58) Field of Classification Search .................. 701/3, 701/123
See application file for complete search history.

(56) References Cited

U.S. PATENT DOCUMENTS

| | | | | |
|---|---|---|---|---|
| 4,642,775 A | * | 2/1987 | Cline et al. ................. | 701/200 |
| 5,121,325 A | * | 6/1992 | DeJonge ..................... | 701/123 |
| 5,398,186 A | * | 3/1995 | Nakhla ....................... | 701/16 |
| 6,078,850 A | * | 6/2000 | Kane et al. .................. | 701/29 |
| 6,148,179 A | * | 11/2000 | Wright et al. ............... | 455/66.1 |
| 6,173,159 B1 | | 1/2001 | Wright et al. | |
| 7,376,495 B2 | * | 5/2008 | Coggins et al. .............. | 701/3 |

FOREIGN PATENT DOCUMENTS

| | | | |
|---|---|---|---|
| WO | 0125727 A1 | 4/2001 | |
| WO | 0208057 A1 | 1/2002 | |
| WO | 03025507 A2 | 3/2003 | |

OTHER PUBLICATIONS

Notification of Transmittal of the International Search Report and the Written Opinion of the International Searching Authority, or the Declaration, Jun. 4, 2007, 16 pgs.
Abdelghany, Khaled et al., A model for the airlines' fuel management strategies, Journal of Air Transport Management, vol. 11, No. 4, Jul. 2005, pp. 199-206.
MyBoeingFleet—Your Portal to Boeing, http://www.boeing.com/commercial/aviationservices/overview, Jun. 24, 2005, 4 pages.
Commercial Aviation Services—Global Customer Support, http://www.boeing.com/commercial/aviationservices/myboeingfleet/, Jun. 24, 2005, 3 pages.
Jeppesen, Electronic Flight Bag, May 2003, 12 pages.
About ACARS, http://www.acarsonline.co.uk/aclink/alabout.htm, Jun. 24, 2005, 4 pages.
Connexion by Boeing, http://www.connexionbyboeing.com/index.cfm, Jun. 14, 2005, 1 page.

* cited by examiner

*Primary Examiner*—Mark Hellner
*Assistant Examiner*—Helal A Algahaim
(74) *Attorney, Agent, or Firm*—Armstrong Teasdale LLP

(57) ABSTRACT

An automated system collects information related to various factors that affect fuel costs, and determines an optimal amount of fuel to be loaded on an aircraft. Information related to an aircraft's fuel efficiency is collected from the aircraft; price information is collected for the stops made by the aircraft; and flight plan information is collected for each flight. The collected information is used to determine or estimate the fuel requirements of the aircraft and an optimal amount of fuel to load onto the aircraft at a location.

23 Claims, 4 Drawing Sheets

AUTOMATED FUELING INFORMATION TRACKING AND FUEL HEDGING

FIELD

Embodiments of the present invention relate generally to computer systems and, more particularly, to computer systems for tracking and processing fueling information for aircraft.

BACKGROUND

Fuel costs are a significant factor in operating airplanes, it also can be very dynamic. The fuel consumption rates of individual airplanes can vary, even among aircraft of the same model and using the same model engines. Determining the actual fuel consumption efficiency of individual airplanes can be difficult due to the various factors that can affect fuel consumption such as, for example, environmental wind direction and speed, temperature, altitude, etc. Many of these factors are dynamic and change during flight. In addition, the cost of fuel may vary from location to location. Thus, an aircraft making a "circuit" of flights to various locations may incur fuel costs that vary on a cost per unit basis. Thus, in addition to the fuel efficiency of the aircraft and engines, the fuel costs can also depend on the price of the fuel (i.e., price per unit) at the various locations.

SUMMARY

According to aspects of various described embodiments, various factors that affect fuel costs are dynamically tracked, collected and processed to determine an optimal amount of fuel to be loaded on an aircraft. In one aspect, information related to an aircraft's fuel efficiency is collected from the aircraft; price information is collected for the stops made by the aircraft; and flight plan information is collected for each flight. Automated systems can be used to track and collect the aircraft's "fuel efficiency" information using systems typically on-board aircraft such as a Flight Management System (FMS) and/or airplane condition monitoring system (ACMS). An automated system can also be used to collect the fuel price information and flight plan information. The collected information is used to determine or estimate the fuel requirements of the aircraft and an optimal amount of fuel to load onto the aircraft at a location. Depending on flight plan and fuel costs, it may be more cost effective to carry fuel needed for future flight segments rather than pay a higher rate during the "circuit". This is known as "tankering fuel".

Embodiments may be implemented as a computer process, a computer system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (a) as a sequence of computer implemented steps running on a computing system and/or (b) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Figure 1:
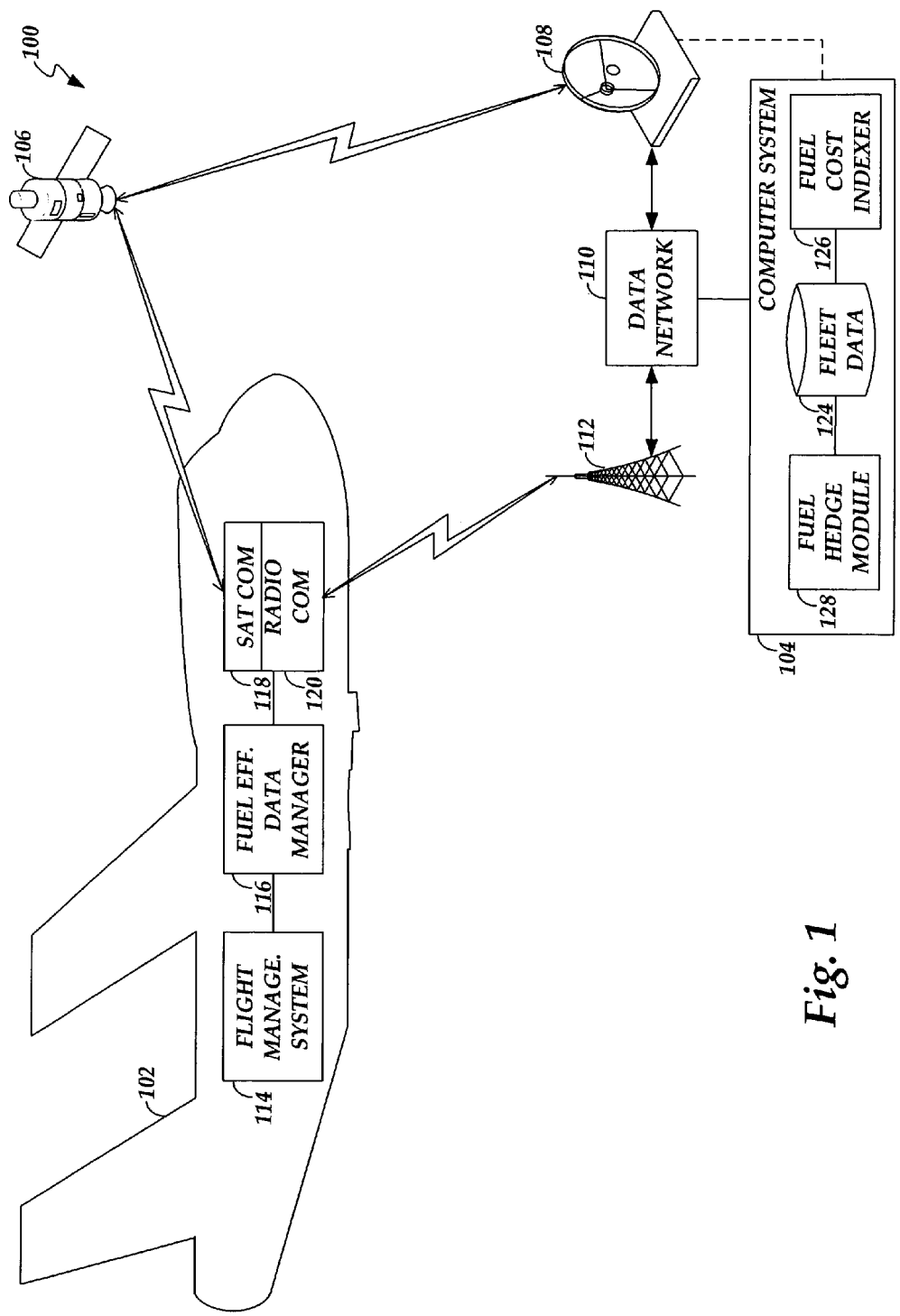
FIG. 1 is a diagram illustrating an exemplary system for automated collection of fueling information and hedging fuel in an aircraft, according to one embodiment.

FIG. 1 illustrates an exemplary system 100 for automated collection of fueling information and hedging fuel, according to one embodiment. In this embodiment, system 100 includes an aircraft 102, a computer system 104 (e.g., a ground-based computer system maintained by an airline or a third party such as Boeing Corporation), one or more satellites 106, one or more satellite communication receivers 108, a data network 110, and one or more radio communication system receivers 112 (note: the radio receivers can be those which communicate with the airplane while in flight or radios, such as 802.11 wireless, which communicate only on the ground). Further, in accordance with this embodiment, aircraft 102 includes a Flight Management System 114, a fuel efficiency data manager 116, a satellite communication unit 118 and a radio communication unit 120. Still further, in accordance with this embodiment, computer system 104 includes a fleet datastore 124, a fuel cost indexer 126 and a fuel hedge component 128 (also referred to herein as fuel hedger 128).

In this embodiment, Flight Management System 114 is coupled to a variety of aircraft sensors (not shown) that provide information related to the performance of the aircraft, and environmental conditions. For example, the sensors may provide information such as engine pressure, engine rotation speeds, global positioning system (GPS) location information, wind speed and direction, temperature, altitude and air pressure. In addition, FMS settings which affect the performance of the aircraft including both flight settings (such as target speeds) and route settings (such as flying off-path to avoid weather) may form part of the collected information. Flight Management System 114 includes interfaces to receive the output signals from the sensors, including analog-to-digital converters for handling analog sensor signals. In some embodiments, Flight Management System 114 is implemented using a Flight Management System (FMS) and airplane condition monitoring system (ACMS) that are typically installed in commercial aircraft.

In some embodiments, additional system parameters can be tracked such as thrust setting or Cost Index. Cost index is a factor which is entered by the flight crew into the Flight Management System, as a constant ranging from 1 to 999. It causes the Flight Management System to value time versus fuel burned. For example, an entry of 1 would cause the Flight Management System to perform all operations to minimize fuel burned. An entry of 999 would cause the FMS to perform all operations to minimize trip time. Note: The FMS provides the speed targets and engine settings in cruise and takeoff. Another input would be the FMS Drag Factor which is set as a variable in each airplane's FMS to account for different drag characteristics of the individual airplanes.

Fuel efficiency data manager 116, in this embodiment, is coupled to Flight Management System 114 to collect and record the data from the sensors. In one embodiment, fuel efficiency data manager 116 is implemented as an application of an Electronic Flight Bag (EFB) typically installed in commercial aircraft. In addition, in accordance with some embodiments, the fuel efficiency data manager also collects fueling information (e.g., price per unit, amount loaded, data and time loaded, etc) for the fuel loaded into aircraft 102. This fueling "receipt" collection function is implemented in the EFB in some embodiments.

In some embodiments, the EFB (not shown) also includes interfaces to communication systems installed in the aircraft (e.g., satellite communication unit 118 and radio communication unit 120), which allows fuel efficiency data manager 116 to send information related to the collected data to computer system 104. In one embodiment, fuel efficiency data manager 116 causes the collected data (e.g., the fueling receipt) to be transmitted to computer system 104 in real-time or near real-time. In other embodiments, fuel efficiency data manager 116 causes a notification message to be transmitted from aircraft 102 to computer system 104 to have the collected data downloaded from aircraft 102 when it lands at the next destination. In some embodiments, the tracking, collection, and downloading of the data is performed by an automated system, avoiding the need for flight crew intervention.

As previously mentioned, aircraft 102 can communicate with other entities using satellite communication unit 118 or radio communication unit 120. In some embodiments, satellite communication unit 118 can be implemented using a transceiver for a packet based digital satellite communication system complying with ARINC 761-2 specification published by the Airlines Electronic Engineering Committee (AEEC). Satellite communication unit 118 can transmit/receive information to/from computer system 104 via one or more satellites 106, one or more satellite communication receivers 108, and data network 110. In an alternative embodiment, satellite communication unit 118 can communicate with computer system 104 using a more direct satellite communication system (indicated by dashed lines in FIG. 2) such as Connexion available from Connexion by Boeing[SM], Seattle Wash.

In some embodiments, radio communication unit 120 can be implemented using a transceiver for a packet based digital radio communication system, such as a VHF transceiver supporting the ACARS (aircraft communications addressing and reporting system). ACARS is typically installed in commercial aircraft.

Further, although not shown in FIG. 1, aircraft 102 can in some embodiments communicate with computer system 104 using a "wired" connection when aircraft 102 is on the ground. For example, in systems that use EFBs, the EFB system includes an EFB ground system that is connected to the aircraft after landing to transfer data between the aircraft's EFB and the computer system.

Still further, although not shown in FIG. 1, aircraft 102 can in some embodiments communicate with computer system 104 using a "wireless" ground connection with aircraft 102. For example, in systems that use EFBs, the EFB system can communicate with an airport (or airline) hosted implementation of 802.11. This allows a direct, secure connection using internet protocols, to the airline host computer system 104 through the data network 110.

Computer system 104 is a computer system that hosts fleet datastore 124, fuel cost indexer 126, and fuel hedger 128. In some embodiments, computer system 104 is implemented by an airline to manage its fleet of aircraft. In other embodiments, computer system 104 can be implemented by a service provider or portal (e.g., MyBoeingFleet available from Boeing Commercial Airplanes, Seattle, Wash.).

Fleet datastore 124, in this embodiment, is a data structure used to store the data generated by and received from aircraft 102, as well as such data from other aircraft in a fleet of aircraft. This information includes data from which the fuel efficiency of each aircraft can be calculated. Fleet datastore 124 can also store information related to routes flown by the fleet (e.g., flight plans, fuel prices at various locations, etc.). For example, fleet datastore 124 may be implemented by a relational database that can be updated by fuel cost indexer 126 and queried by fuel hedger 128.

Fuel cost indexer 126, in this embodiment, is an application or module hosted by computer system 104 that processes fueling information received for each aircraft and stores the fueling information in fleet datastore 124. As described above, the fueling information can include time/date, price and amount information for fuel obtained at a particular airport, and in some embodiments includes information that can be used to calculate fuel efficiency for the aircraft (including the particular engine(s) mounted on the aircraft). In some embodiments, fuel cost indexer 126 can also receive fuel price information from other sources and utilize an algorithm to generate the most probable price. In one embodiment, fuel cost indexer 126 could use a Kalman Filter to receive fuel prices from many different sources, and assign a heuristic weighting factor to those inputs based on the "age" of the information and the actually accuracy as recorded by the fuel sales.

Fuel hedger 128 is an application or module hosted by computer system 104 that processes the fuel efficiency information for aircraft 102, the flight plan information the aircraft, and the fueling information (e.g., fuel price) for the locations to which aircraft 102 will fly. For example, for a flight of aircraft 102 from a location A to a location B, fuel hedger 128 can obtain from fleet datastore 124: (a) the expected fuel price at a location A; (b) the expected fuel price at a location B; (c) the expected amount of fuel needed by aircraft 102 to fly from location A to location B; (d) the expected amount of fuel needed by aircraft 102 to fly from location B to its next destination (e.g., a location C); and (e) the fuel capacity of aircraft 102.

From this data, fuel hedger 128 can determine the optimal amount of fuel (based on fuel cost) to be loaded on aircraft 102 at location A. For example, if the price of fuel was significantly less expensive at location A compared to location B, aircraft 102 could "tank" fuel (i.e., load extra fuel) at location A so that less fuel would be need to be loaded location B for aircraft 102 to fly from location B to location C. In some circumstances, it may be more cost effective to tank fuel from location A to location B (despite the extra costs incurred due to the extra weight of the extra fuel) rather than obtain all of the needed fuel (i.e., needed to fly from location B to location C) at location B. Based on the output of fuel hedger 128, computer system 104 can then provide fueling instructions to aircraft 102 for refueling at location A.

Figure 2:
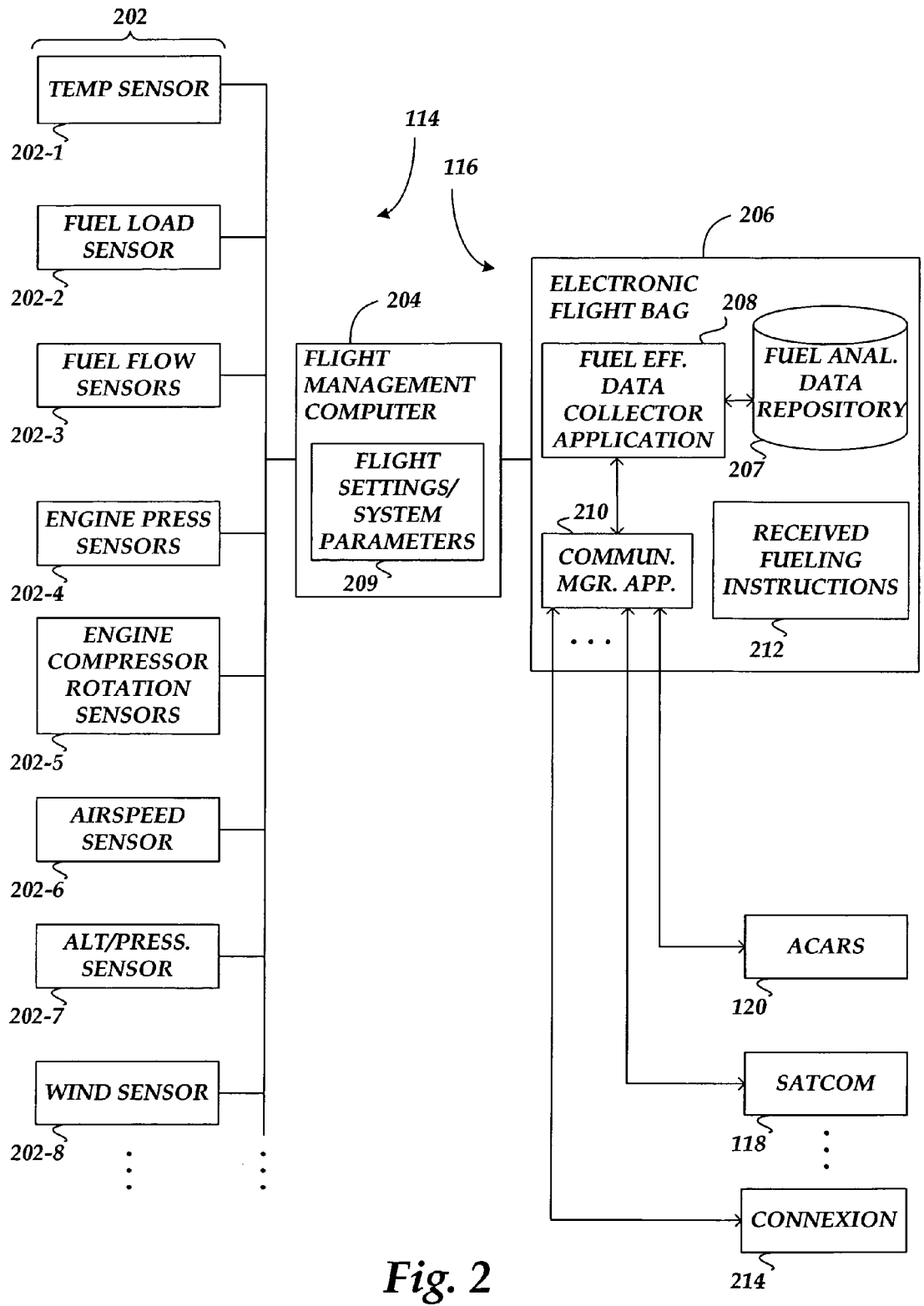
FIG. 2 is a diagram illustrating exemplary airplane components of the system depicted in FIG. 1, according to one embodiment.

FIG. 2 illustrates exemplary components of aircraft 102 (FIG. 1) used for tracking and collecting fuel consumption data, according to one embodiment. In this embodiment, aircraft 102 includes sensors 202 that sense various environmental and aircraft conditions, a flight management computer 204, and an electronic flight bag (EFB) system 206, a fuel analysis data repository 207, which hosts a fuel efficiency data collector application 208 and a communications manager application 210.

In this embodiment, sensors 202 include one or more of each of the following: a temperature sensor 202-1; a fuel load sensor 202-2; a fuel flow sensor 202-3; an engine pressure sensor 202-4; an engine compressor rotation speed sensor 202-5; an airspeed sensor 202-6; an altitude/air pressure sensor 202-7; and a wind speed and direction sensor 202-8. Additional sensors may be used in other embodiments. Flight management computer 204 is coupled to receive the output signals from sensors 202, and in some embodiments to a GPS unit (not shown). In one embodiment, flight management computer 204 is implemented using a commercially available flight management computer such as used in some commercial aircraft. Such flight management computers typically interface with other sensors (not shown) in addition to sensors 202 shown in FIG. 2. Sensors 202 and flight management computer 204 together implement an embodiment of Flight Management System 114 (FIG. 1). The flight management computer can also provide internal data which is used by the FMS to derive the flight path and engine settings such as: Cost Index, Drag Factor, Offset route operation, Optimum Altitude, Autothrottle settings, and others. This internal data is indicated as flight settings and system parameters 209 in flight management computer 204.

Fuel efficiency data collector application 208 and communications manager application 210 are hosted by EFB 206. In one embodiment, EFB 206 is implemented using an EFB available from Boeing. Fuel efficiency data collector application 208 communicates with flight management computer 204 to obtain sensor data and internal FMS data used in determining the aircraft's fuel efficiency. For example, in this embodiment fuel efficiency data collector application 208 periodically retrieves "snapshots" of the data from sensors 202 to be used in determining the aircraft's fuel efficiency by computer system 104 (FIG. 1). The collected data can then be stored in fuel analysis data repository 207 e.g., as described in co-filed and commonly-assigned U.S. Patent Application No. (Attorney Docket No. 60113.0008US01), by David L. Allen, entitled Fuel Consumption Data Tracking/Collection and Aircraft/Route Optimization.

Communications manager application 210 provides an interface between fuel efficiency data collector application 208 (and other applications running on EFB 206) and the communications units 118 and 120 (see FIG. 1). In this embodiment, satellite communication unit 118 is an ARINC 761 compliant satellite communication (SATCOM) system, and radio communication unit 120 is an ACARS compliant system. Communications manager application 210 can select the appropriate communications unit to transmit data collected by fuel efficiency data collector application 208 (e.g., some locations may support ACARS but not SATCOM communications). In addition, communications manager application 210 can format the data as required by the selected communications unit. As shown in FIG. 2, communications manager application 210 can also serve as an interface to other communications units such as a unit 214 to support the aforementioned Connexion by Boeing$^{SM}$ system, which is a satellite packet-based communication system or an airport wireless connection.

In some embodiments, during a flight (e.g., during the flight to location A as described in the example above), fuel efficiency data collector application 208 can use communication manager application 210 to send fuel efficiency information to computer system 104 (FIG. 1) so that updated fuel efficiency values can be calculated for the aircraft. Further, in some embodiments, fuel cost indexer 126 can obtain pricing information for fuel at location A from either historical data stored in fleet datastore 124 or by requesting a quote from one or more vendors at location A. In some scenarios, the efficiency data and fuel pricing information may be obtained by computer system 104 after the aircraft has landed at location A.

Fuel hedger 128 (FIG. 1) of computer system 104 can then determine the optimal amount of fuel to obtain for the subsequent flights to locations B and C based on the updated fuel efficiency calculations and fuel prices as described previously. Computer system 104 can then send fueling instructions (i.e., to load the optimal amount of fuel determined by fuel hedger 128) to the aircraft via one of the communication systems such as ACARS unit 120, SATCOM unit 118, or Connexion unit 214. In one embodiment, the aircraft stores the received fueling instructions in a fueling instructions datastore 212 of EFB 206.

Exemplary Operational Flow: Fuel Hedging

Figure 3:
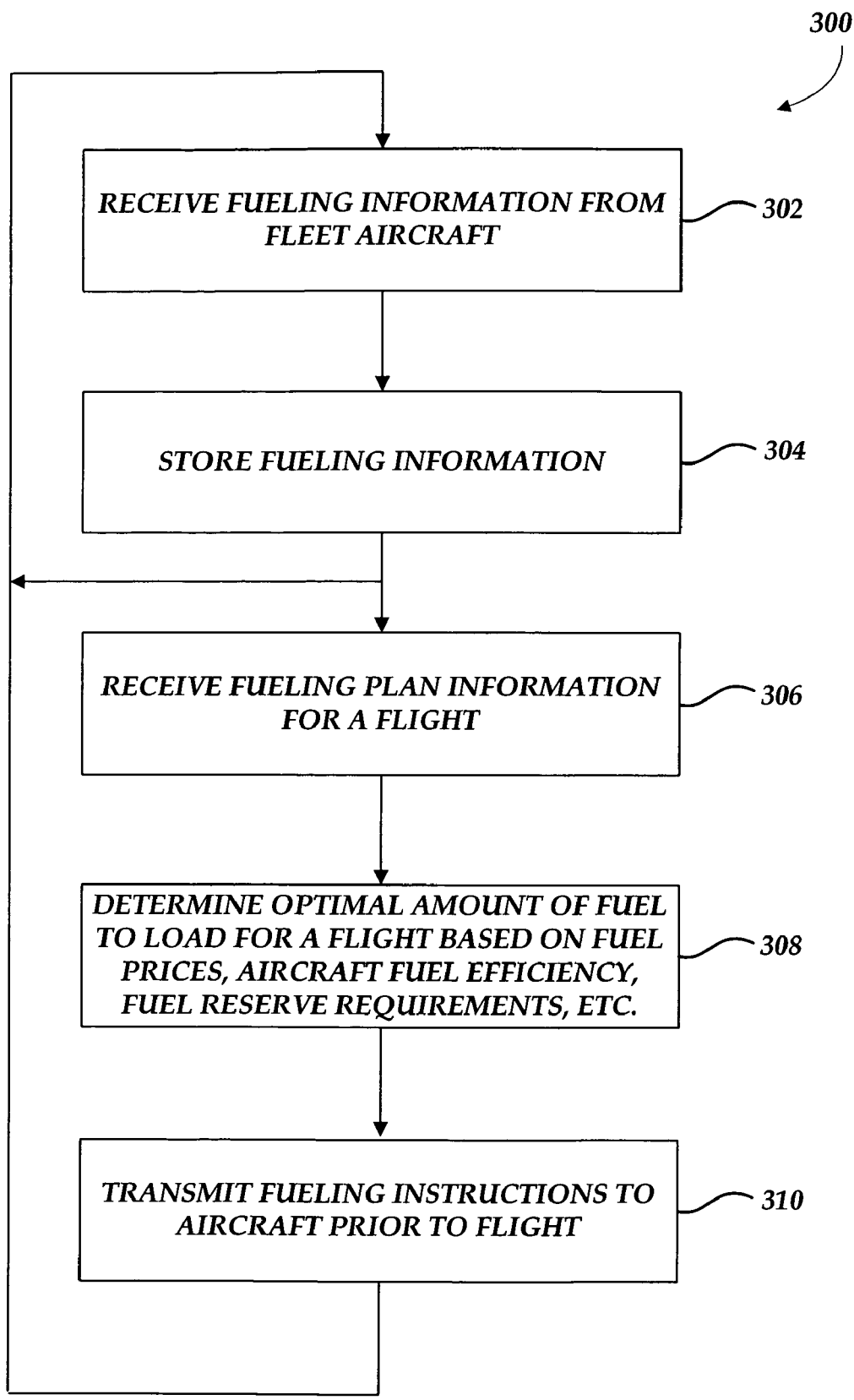
FIG. 3 is a flow diagram illustrating an exemplary operational flow for implementing fuel hedging in an aircraft, according to one embodiment

FIG. 3 is a flow diagram illustrating an exemplary operational flow for implementing fuel hedging in an aircraft, according to one embodiment. Operational flow 300 may be performed in any suitable computing environment. For example, operational flow 300 may be performed by a computer system such as computer system 104 (FIG. 1). Therefore, the description of operational flow 300 may refer to at least one of the components of FIG. 1. However, any such reference to components of FIG. 1 is for descriptive purposes only, and it is to be understood that the implementations of FIG. 1 is a non-limiting environment for operational flow 300.

At a block 302, fueling information is received from an aircraft. In one embodiment, the fueling information includes fueling information such as date, price and amount information for fuel obtained at a particular airport, and in some embodiments includes information that can be used to calculate fuel efficiency for the aircraft (including the particular engine(s) mounted on the aircraft) such as the information collected by fuel efficiency data collector application 208 (FIG. 2). Further, in some embodiments the fueling information can include the available fuel capacity of the aircraft at the end of each flight. In some embodiments, block 302 is performed by a computer system such as computer system 104 (FIG. 1) for each aircraft in a fleet of aircraft. As previously described, such a computer system may be implemented by an airline that operates the fleet of aircraft. In one embodiment, the computer system can host an indexing module such as fuel cost indexer 126 to receive fueling information from the aircraft.

At a block 304, the received fueling information is stored. In one embodiment, the fueling information is stored in a datastore such as fleet datastore 124 (FIG. 1). For example, the aforementioned indexing module can store received fueling information in the datastore. In one embodiment, the received fueling information is used to update a database of fueling information (e.g., updated to store the most recent fuel price at each location served by the fleet of aircraft) or, alternatively, stored in the form of a log or history.

In this embodiment, blocks 302 and 304 form a sub-operational flow that is asynchronous with the remaining blocks of operational flow 300. That is, the sub-operational flow returns to block 302 to, in effect, continuously receive and store fueling information from a fleet of aircraft. However, operational flow 300 can, from time-to-time, proceed to a block 306. For example, in one embodiment, operational flow 300 proceeds to block 306 at a selected periodic schedule. In other embodiments, an event (e.g., a change in fuel price at a location, an aircraft of the fleet arriving at a location, an aircraft of the fleet preparing to refuel, or the "filing" of a flight plan, etc.) can cause operational flow 300 to proceed to block 306. In some embodiments, blocks 302 and 304 can be performed independently and concurrently with the sub-operational flow starting with block 306.

At block 306, flight plan information is received. In one embodiment, the aforementioned computer system can receive the flight plan information from a datastore such as fleet datastore 124, or from some other component or module of the computer system. In other embodiments, the flight plan could be transmitted from the airplane FMS to the ground system. This flight plan information can include the flight schedule of each aircraft in the fleet, the distance of each flight, the fuel reserve requirements of each flight, etc.

At a block 308, an optimal amount of fuel to load for a flight is determined. In one embodiment, a component or module (such as fuel hedger 128 of FIG. 1) of the computer system is used to determine an optimal amount of fuel to load. In one scenario, this fuel hedging component is configured to determine whether an aircraft should tank fuel based on the fuel costs (i.e., as opposed to fuel consumption, for example). For an aircraft scheduled to fly from location A to location B and then to location C, in one embodiment, the optimal amount of fuel to be loaded (based on fuel cost) is determined using the following factors: (a) the fuel price at the departure location (location A): (b) the fuel price at the destination location (location B); (c) the fuel efficiency of the aircraft; (d) the fuel efficiency of the engine(s) mounted on the aircraft; (e) the amount of fuel required for the next flight (i.e., to fly from location B to location C); (f) the fuel reserve requirements for the flight from location A to location B; and (g) the available fuel capacity of the aircraft after arriving at the departure location (location A). In other embodiments, additional and/or fewer factors may be used in determining the optimal amount of fuel for an aircraft to load.

At a block 310, fueling instructions based on the operations of block 308 are provided to the aircraft. In one embodiment, the For example, any of the communications systems described above in conjunction with FIG. 1 can be used to transmit the fueling instructions to the aircraft.

Although operational flow 300 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Exemplary Operational Flow: Aircraft Operations for Fuel Hedging

Figure 4:
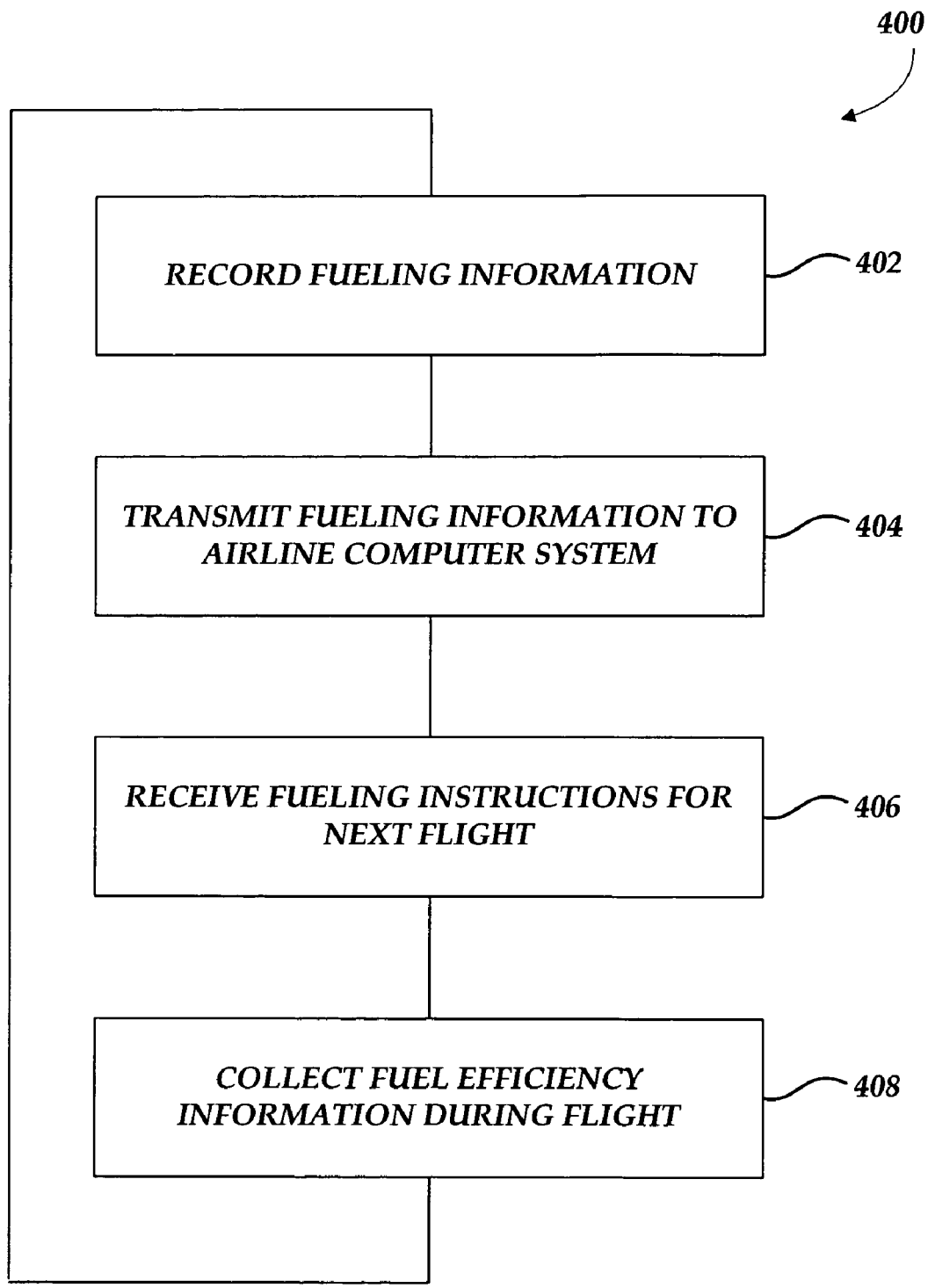
FIG. 4 is a flow diagram illustrating an exemplary operational flow in an aircraft for collecting data used in implementing fuel hedging, according to one embodiment.

FIG. 4 illustrates an exemplary operational flow 400 performed by an aircraft for collecting data used in implementing fuel hedging, according to one embodiment. Operational flow 400 may be performed in any suitable computing environment. For example, operational flow 400 may be performed by a system such as that shown in FIG. 2. Therefore, the description of operational flow 400 may refer to at least one of the components of FIG. 2. However, any such reference to components of FIG. 2 is for descriptive purposes only, and it is to be understood that the implementations of FIG. 2 is a non-limiting environment for operational flow 400.

At a block 402, fueling information is recorded. In one embodiment, a component such as fuel efficiency data collector application 208 (FIG. 2) of EFB 206 (FIG. 2) can collect and record the fueling information in a datastore such as fuel analysis data repository 207 (FIG. 2) of EFB 206. This fueling information can include time/date, price and amount information for fuel obtained at a particular airport. In this embodiment, the fueling information also includes information related to the aircraft's fuel efficiency such as information collected by sensors 202 (FIG. 2) and information from flight settings and system parameters 209 (FIG. 2).

At a block 404, the fueling information collected at block 402 is provided to a computer system such as an airline computer system for the airline that operates the aircraft. The computer system can store and process the fueling information (e.g., as described above using computer system 104, fleet datastore 124 and fuel hedger 128). In one embodiment, the fueling information is transmitted using a SATCOM unit or a radio communication unit typically installed on commercial aircraft. In one embodiment, the aircraft can send a message to the computer system to notify the computer system to download the collected data upon landing. As previously described, the computer system can then use the fueling information to determine an optimal amount of fuel for the aircraft to load for its next flight (e.g., based on fuel costs).

At a block 406, the aircraft receives fueling instructions for the next flight. In one embodiment, a component such as the aforementioned fuel efficiency data collector application 208 of EFB 206 receives the fueling instructions and stores them in a datastore such as received fueling instructions datastore 212 of EFB 212. Airline personnel can then ensure that the aircraft is refueled according to the received fueling instructions.

At a block 408, the aircraft collects fuel efficiency information during the flight. That is, after the aircraft has been refueled according to block 406 and has started the next flight, the aircraft begins collecting information related to fuel efficiency. As mentioned above in conjunction with block 402, this information can include information provided by sensors 202. Operational flow 400 can then return to block 402.

Although operational flow 400 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method for determining an amount of fuel to load into an aircraft prior to a flight, the method comprising:
   receiving fueling information, wherein the fueling information includes information related to available fuel capacity of the aircraft at the end of the flight, information related to the in flight performance of the aircraft and the one or more engines mounted thereto, and prices of fuel at a plurality of locations to which the aircraft is to fly;
   receiving flight plan information for the aircraft for a next flight;
   determining an optimal amount of fuel to load into the aircraft based on the received fueling information and the received flight plan information; and
   providing fueling instructions to the aircraft based on the determined optimal amount.

2. The method of claim 1 wherein the optimal amount of fuel causes the aircraft to carry more fuel than is required to meet a fuel reserve requirement.

3. The method of claim 1 wherein at least a portion of the information related to fuel efficiency is automatically collected by the aircraft during a flight.

4. The method of claim 1 wherein the determining is triggered by a filing of a flight plan for the aircraft.

5. The method of claim 1 wherein the determining is triggered by notification of the aircraft landing at a destination.

6. The method of claim 1 wherein the determining is triggered by a change in fuel price at a location of the plurality of locations.

7. The method of claim 1 wherein a portal service is used to receive fueling information and the flight plan information and to determine the optimal amount of fuel to load into the aircraft.

8. The method of claim 1 wherein the received flight plan information includes environmental conditions expected during the next flight.

9. One or more computer-readable media having thereon instructions that when executed by a computer implement the method of claim 1.

10. A system for determining an amount of fuel to load into an aircraft, the system comprising:
    means for receiving information related to available fuel capacity of the aircraft at the end of a planned flight, information related to the in flight performance of the aircraft and the one or more engines mounted thereto, and information related to prices of fuel at a plurality of locations to which the aircraft is scheduled to fly;
    means for receiving flight plan information for the aircraft for a next flight;
    means for determining an optimal amount of fuel to load into the aircraft based on the received information and the received flight plan information; and
    means for providing fueling instructions to the aircraft based on the determined optimal amount.

11. The system of claim 10 wherein the optimal amount of fuel causes the aircraft to carry more fuel than is required to meet a fuel reserve requirement.

12. The system of claim 10 wherein the fueling information includes information related to fuel efficiency of the aircraft.

13. The system of claim 12 wherein at least a portion of the information related to fuel efficiency is automatically collected by the aircraft during a flight.

14. The system of claim 10 wherein the means for determining is triggered to determine the optimal amount of fuel by a filing of a flight plan for the aircraft.

15. The system of claim 10 wherein the means for determining is triggered to determine the optimal amount of fuel by notification of the aircraft landing at a destination.

16. The system of claim 10 wherein the means for determining is triggered to determine the optimal amount of fuel by a change in fuel price at a location of the plurality of locations.

17. The system of claim 10 wherein a portal service is used to implement the means for receiving fueling information, the means for receiving flight plan information, and the means for determining the optimal amount of fuel.

18. The system of claim 10 wherein the received flight plan information includes environmental conditions expected during the next flight.

19. A system for determining an amount of fuel to load into an aircraft, the system comprising:
    a fleet of aircraft each including:
        a fuel data manager to obtain fueling information, wherein the fueling information includes information related to available fuel capacity of the aircraft at the end of a flight and information related to the in flight performance of the aircraft and the one or more engines mounted thereto, and at least one wireless communication unit, coupled to the fuel data manager, to selectively transmit the fueling information; and a computer system communicatively coupled to the fleet of aircraft, the computer system including:

a fuel cost indexer to receive price information of fuel for a plurality of locations to which the fleet of aircraft flies, a datastore to store fueling information received from the fleet of aircraft, and a fuel hedger component to determine an optimal amount of fuel to load into each aircraft of the fleet of aircraft based on the stored fueling information, the price information and flight plan information for each aircraft's next flight.

20. The system of claim 19 wherein the optimal amount of fuel causes the aircraft to carry more fuel than is required to meet a fuel reserve requirement.

21. The system of claim 19 wherein the fueling information includes information related to fuel efficiency of the aircraft.

22. The system of claim 21 wherein at least a portion of the information related to fuel efficiency is automatically collected by each aircraft of the fleet of aircraft while in flight.

23. The system of claim 21 wherein the received flight plan information includes environmental conditions expected during the next flight.

* * * * *

UNITED STATES PATENT AND TRADEMARK OFFICE
CERTIFICATE OF CORRECTION

PATENT NO. : 7,647,163 B2  Page 1 of 1
APPLICATION NO. : 11/197156
DATED : January 12, 2010
INVENTOR(S) : David L. Allen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 579 days.

Signed and Sealed this

Sixteenth Day of November, 2010

David J. Kappos
*Director of the United States Patent and Trademark Office*